(12) United States Patent
Miyata

(10) Patent No.: US 9,071,979 B2
(45) Date of Patent: Jun. 30, 2015

(54) COMMUNICATION APPARATUS AND COMMUNICATION METHOD

(75) Inventor: Takeo Miyata, Daito (JP)

(73) Assignee: KYOCERA Corporation, Kyoto (JP)

( * ) Notice: Subject to any disclaimer, the term of this patent is extended or adjusted under 35 U.S.C. 154(b) by 445 days.

(21) Appl. No.: 13/522,256

(22) PCT Filed: Jan. 13, 2011

(86) PCT No.: PCT/JP2011/050467
§ 371 (c)(1),
(2), (4) Date: Jul. 13, 2012

(87) PCT Pub. No.: WO2011/087064
PCT Pub. Date: Jul. 21, 2011

(65) Prior Publication Data
US 2012/0281583 A1    Nov. 8, 2012

(30) Foreign Application Priority Data

Jan. 15, 2010    (JP) ................................. 2010-007081

(51) Int. Cl.
*H04W 4/00*       (2009.01)
*H04W 16/28*      (2009.01)
(Continued)

(52) U.S. Cl.
CPC ............. *H04W 16/28* (2013.01); *H04B 7/0413* (2013.01); *H04B 7/0669* (2013.01); *H04B 7/0689* (2013.01); *H04B 7/0697* (2013.01)

(58) Field of Classification Search
USPC ......... 370/230, 236, 252, 328, 332, 334, 339, 370/342, 465, 466
See application file for complete search history.

(56) References Cited

U.S. PATENT DOCUMENTS 6,496,157 B1 *  12/2002  Mottier ........................ 343/853
8,085,721 B2 *  12/2011  Ylitalo ......................... 370/329
(Continued)

FOREIGN PATENT DOCUMENTS

JP    2002-058061 A    2/2002
JP    2004-072624 A    3/2004
(Continued)

OTHER PUBLICATIONS

Office Action dated Jun. 4, 2014 issued in counterpart Chinese application No. 2011-80006111.8.
(Continued)

*Primary Examiner* — Kwang B Yao
*Assistant Examiner* — Nguyen Ngo
(74) *Attorney, Agent, or Firm* — Procopio, Cory, Hargreaves & Savitch LLP

(57) ABSTRACT

When switching a setting of a communication mode for a transmitting signal to a different communication apparatus from a non-spatial multiplexing mode to a spatial multiplexing mode on the basis of a first communication quality, a switching unit stores the first communication quality as a switchover reference value and then, when the first communication quality in a case of switching the setting of the communication mode for the transmitting signal to the different communication apparatus from the spatial multiplexing mode to the non-spatial multiplexing mode on the basis of a second communication quality is larger than the switchover reference value by a value which is equal to or more than a predetermined value, halts the switchover of the setting, to the spatial multiplexing mode, of the communication mode for the transmitting signal to the different communication apparatus until a predetermined requirement is satisfied.

16 Claims, 8 Drawing Sheets

(51) Int. Cl.
  *H04B 7/04*  (2006.01)
  *H04B 7/06*  (2006.01)

(56) References Cited

U.S. PATENT DOCUMENTS

| | | | |
|---|---|---|---|
| 8,725,084 B2* | 5/2014 | Lou et al. .................. | 455/69 |
| 2005/0174981 A1* | 8/2005 | Heath et al. ................ | 370/342 |
| 2006/0128309 A1 | 6/2006 | Dateki et al. | |
| 2007/0008943 A1* | 1/2007 | Grant et al. ................ | 370/342 |
| 2008/0013504 A1 | 1/2008 | Nishibayashi et al. | |
| 2008/0051129 A1 | 2/2008 | Abe et al. | |
| 2009/0213955 A1 | 8/2009 | Higuchi et al. | |
| 2009/0247093 A1 | 10/2009 | Saito | |
| 2009/0310696 A1* | 12/2009 | Yang .......................... | 375/267 |
| 2010/0202313 A1* | 8/2010 | Barratt et al. .............. | 370/252 |
| 2010/0291918 A1* | 11/2010 | Suzuki et al. ............. | 455/422.1 |
| 2011/0243265 A1 | 10/2011 | Dateki et al. | |
| 2012/0287788 A1* | 11/2012 | Sato et al. ................. | 370/235 |

FOREIGN PATENT DOCUMENTS

| | | |
|---|---|---|
| JP | 2005-094255 A | 4/2005 |
| JP | 2006-173834 A | 6/2006 |
| JP | 2008-022173 A | 1/2008 |
| JP | 2009-021935 A | 1/2009 |
| JP | 2009-038447 A | 2/2009 |
| JP | 2009-253379 A | 10/2009 |
| JP | 2009-273186 A | 11/2009 |
| JP | 2009-542164 A | 11/2009 |
| WO | 2005/122414 A1 | 12/2005 |
| WO | 2006/106613 A1 | 10/2006 |
| WO | 2008/003087 A2 | 1/2008 |
| WO | 2009091028 A1 | 7/2009 |

OTHER PUBLICATIONS

Notice of Grounds of Rejection dated May 21, 2013, issued in counterpart Japanese Application No. 2010-007081.
International Search Report dated Feb. 15, 2011, issued for International Application No. PCT/JP2011/050467.

* cited by examiner

FIG.3

| COMMUNICATION LEVEL | MIMO | MCS |
|---|---|---|
| 1 | MATRIX-A | QPSK 1/2 |
| 2 | MATRIX-A | QPSK 3/4 |
| 3 | MATRIX-A | 16QAM 1/2 |
| 4 | MATRIX-A | 16QAM 3/4 |
| 5 | MATRIX-A | 64QAM 1/2 |
| 6 | MATRIX-A | 64QAM 2/3 |
| 7 | MATRIX-A | 64QAM 3/4 |
| 8 | MATRIX-A | 64QAM 5/6 |
| 9 | MATRIX-B | 64QAM 1/2 |
| 10 | MATRIX-B | 64QAM 2/3 |
| 11 | MATRIX-B | 64QAM 3/4 |
| 12 | MATRIX-B | 64QAM 5/6 |

(a)

(b)

COMMUNICATION APPARATUS AND COMMUNICATION METHOD

TECHNICAL FIELD

The present invention relates to a communication apparatus and a communication method. Particularly, the present invention relates to a communication apparatus that allows spatial multiplexing for a transmitting signal, and a communication method for such a communication apparatus.

BACKGROUND ART

In various radio communication systems for WiMAX (Worldwide Interoperability for Microwave Access) (registered trademark), next generation PHS (Personal Handy-Phone System), LTE (Long Term Evolution) and the like, a communication technology in which both of a transmitting side and a receiving side include a plurality of antennas, that is, MIMO (Multiple Input Multiple Output) has been employed for improving throughput and frequency utilization efficiency.

Examples of MIMO to be employed in a downlink communication mode from a radio base station to a radio terminal include an STC (Space-Time Coding) base and an SM (Spatial Multiplex) base (for example, refer to Patent Literature 1 (Japanese Patent Laying-Open No. 2009-273186)).

According to the STC base, the radio base station places (i.e., codes) one signal stream on the basis of a certain rule with regard to time and space (antenna), and transmits the coded signal stream through a plurality of antennas. In WiMAX, this STC base downlink communication mode is called DL MIMO MATRIX-A (hereinafter, simply referred to as MATRIX-A).

On the other hand, according to the SM base, the radio base station multiplex-transmits a plurality of signal streams through a plurality of antennas at a single frequency. In WiMAX, this SM base downlink communication mode is called DL MIMO MATRIX-B (hereinafter, simply referred to as MATRIX-B).

CITATION LIST

Patent Literature

PTL 1: Japanese Patent Laying-Open No. 2009-273186

SUMMARY OF INVENTION

Technical Problem

Depending on conditions of a transmission path, the radio terminal is occasionally improved in throughput characteristic and area characteristic, further, frequency utilization efficiency by employing the MIMO communication mode based on the space-time coding mode (DL MIMO MATRIX-A) which is the non-spatial multiplexing mode or the radio terminal is occasionally improved in throughput characteristic and area characteristic, further, frequency utilization efficiency by employing the MIMO communication mode based on the spatial multiplexing mode (DL MIMO MATRIX-B).

Typically, the switchover from the space-time coding mode to the spatial multiplexing mode is performed on the basis of a communication quality such as a CINR. Therefore, although the switchover to the spatial multiplexing mode was performed because of a high communication quality, at the time when the radio terminal is present, communication in the spatial multiplexing mode is occasionally inappropriate because of high patial correlation. In such a case, the communication in the spatial multiplexing mode is not stable, so that throughput is degraded.

Hence, it is an object of the present invention to provide a communication apparatus and a communication method each capable of appropriately performing switchover of a communication mode from a non-spatial multiplexing mode to a spatial multiplexing mode.

Solution to Problem

In order to solve the problems described above, a communication apparatus according to the present invention includes: a plurality of antennas; a quality managing unit for acquiring or calculating a first communication quality and a second communication quality of a received signal at a different counterpart communication apparatus; a switching unit for switching a setting of a communication mode for a transmitting signal to the different communication apparatus from a non-spatial multiplexing mode to a spatial multiplexing mode on the basis of the first communication quality, and switching the setting of the communication mode for the transmitting signal to the different communication apparatus from the spatial multiplexing mode to the non-spatial multiplexing mode on the basis of the second communication quality; and a transmitting unit for processing the transmitting signal to the different communication apparatus to output the processed signal to the plurality of antennas, on the basis of the set communication mode. Herein, the switching unit stores the first communication quality as a switchover reference value when switching the setting of the communication mode for the transmitting signal to the different communication apparatus from the non-spatial multiplexing mode to the spatial multiplexing mode on the basis of the first communication quality and then, when the first communication quality in a case of switching the setting of the communication mode for the transmitting signal to the different communication apparatus from the spatial multiplexing mode to the non-spatial multiplexing mode is larger than the switchover reference value by a value which is equal to or more than a predetermined value, halts the switchover, to the spatial multiplexing mode, of the setting of the communication mode for the transmitting signal to the different communication apparatus until a predetermined requirement is satisfied.

Advantageous Effects of Invention

According to the present invention, it is possible to appropriately perform switchover of a communication mode from a non-spatial multiplexing mode to a spatial multiplexing mode.

BRIEF DESCRIPTION OF DRAWINGS

FIG. 3 is a diagram for illustrating a communication level.

DESCRIPTION OF EMBODIMENTS

Figure 1:
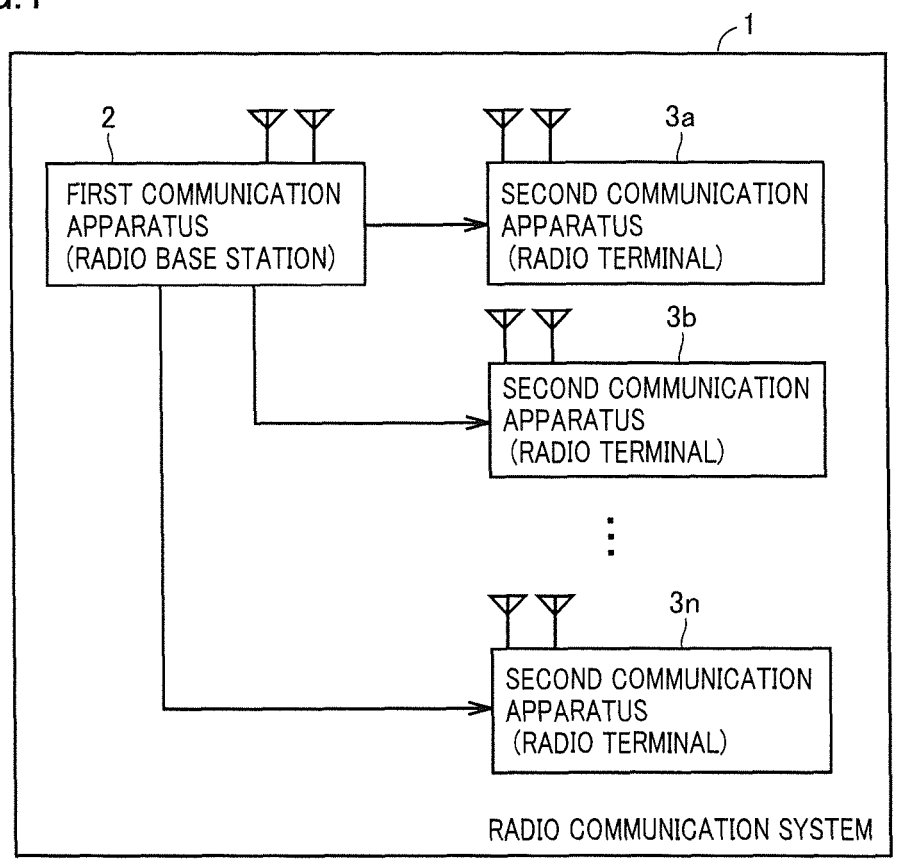
FIG. 1 is a diagram showing a radio communication system according to one embodiment of the present invention.

Hereinafter, embodiments of the present invention will be described with reference to the drawings.
[First Embodiment]
FIG. 1 is a diagram showing a radio communication system according to one embodiment of the present invention.

With reference to FIG. 1, the radio communication system has a first communication apparatus 2, and "n" second communication apparatuses 3a to 3n. A downlink signal of user data is transmitted between first communication apparatus 2 and "n" second communication apparatuses 3a to 3n in accordance with an MIMO communication mode based on a space-time coding mode (DL MIMO MATRIX-A) or an MIMO communication mode based on a spatial multiplexing mode (DL MIMO MATRIX-B). Hereinafter, a second communication apparatus denoted with reference sign 3 represents one of second communication apparatuses 3a to 3n.

First communication apparatus 2 may be, for example, a radio base station, and each of second communication apparatuses 3a to 3n may be, for example, a radio terminal. The radio base station allows simultaneous communication with plural ones of the "n" radio terminals.
(Configuration of Radio Base Station)
FIG. 2 is a diagram showing a configuration of a radio base station according to a first embodiment.

Figure 2:
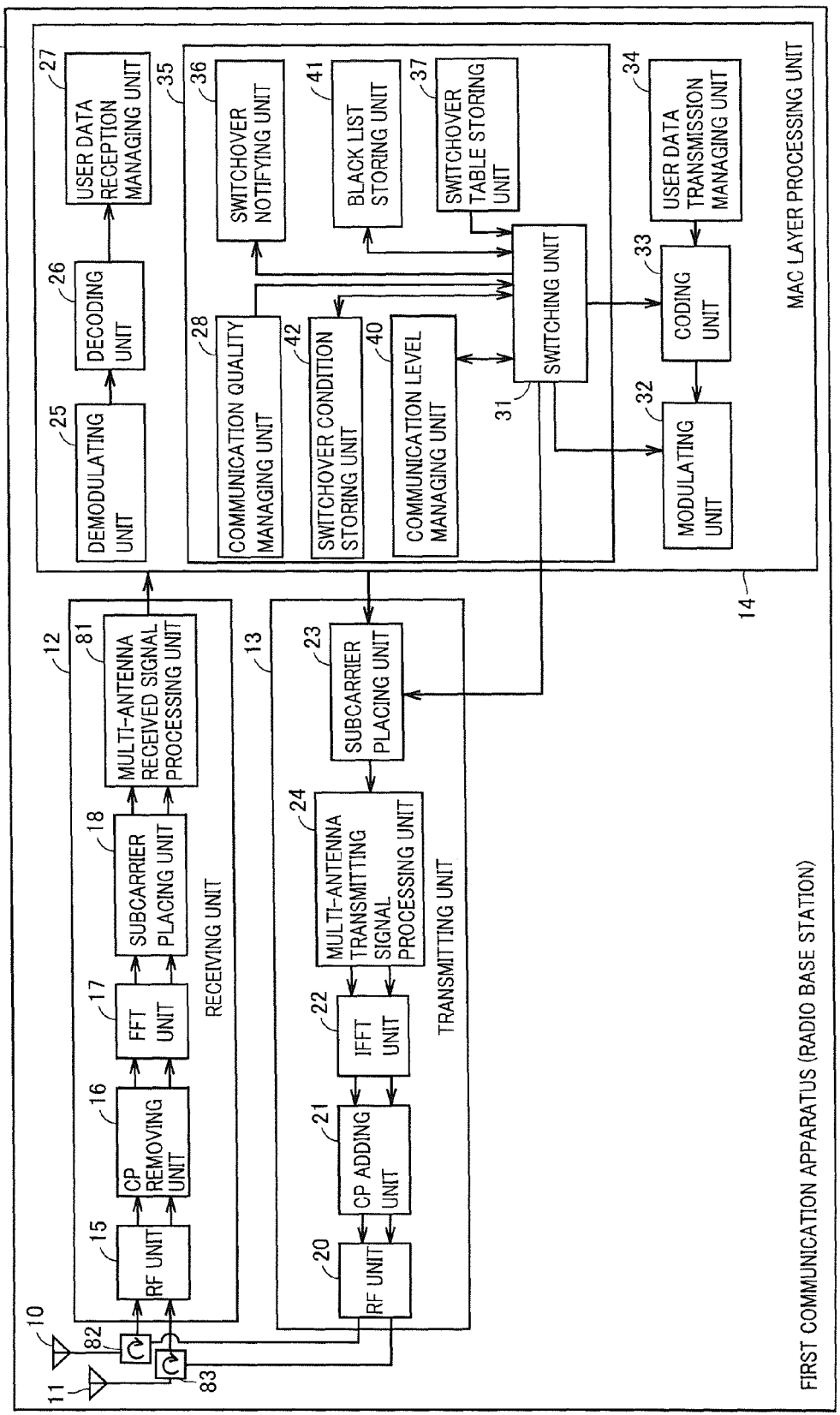
FIG. 2 is a diagram showing a configuration of a radio base station according to a first embodiment.

With reference to FIG. 2, radio base station 2 includes a first antenna 10, a second antenna 11, a first coupler/distributor 82, a second coupler/distributor 83, a transmitting unit 13, a receiving unit 12 and an MAC (Media Access Control) layer processing unit 14.

First coupler/distributor 82 is configured with, for example, a circulator, outputs a signal from transmitting unit 13 to first antenna 10, and outputs a signal from first antenna 10 to receiving unit 12.

Second coupler/distributor 83 is configured with, for example, a circulator, outputs a signal from transmitting unit 13 to second antenna 11, and outputs a signal from second antenna 11 to receiving unit 12.

Transmitting unit 13 includes a multi-antenna transmitting signal processing unit 24, a subcarrier placing unit 23, an IFFT (Inverse First Fourier Transform) unit 22, a CP (Cyclic Prefix) adding unit 21 and an RF (Radio Frequency) unit 20.

Subcarrier placing unit 23 places a subcarrier on the basis of, for example, PUSC (Partial Usage of Subchannels).

Multi-antenna transmitting signal processing unit 24 performs space-time coding (e.g., Alamouti coding) on one data stream in a case where a set MIMO communication mode is MATRIX-A, and performs spatial multiplexing on a plurality of data streams in a case where the set MIMO communication mode is MATRIX-B.

IFFT unit 22 transforms a plurality of subcarrier signals (frequency domain signals) to be output from multi-antenna transmitting signal processing unit 24 to time domain signals (OFDMA (Orthogonal Frequency Division Multiple Access) symbols) by IFFT.

CP adding unit 21 adds, as a CP, the same signal as a trailing end of an OFDMA symbol to a leading end of the OFDMA symbol.

RF unit 20 includes an upconverter for up-converting a signal into a predetermined radio frequency band allocated for communication with a radio terminal, a power amplifier circuit for amplifying the up-converted signal, a band-pass filter for passing only a signal component, in a desired band, of the amplified signal and then outputting the signal component to first antenna 10 and second antenna 11, and the like.

Receiving unit 12 includes an RF unit 15, a CP removing unit 16, an FFT unit 17, a subcarrier placing unit 18 and a multi-antenna received signal processing unit 81.

RF unit 15 includes a band-pass filter for passing only a signal component, in a desired band, of a signal to be output from first antenna 10 and second antenna 11, a low noise amplifier circuit for amplifying an RF signal, a downconverter for down-converting an RF signal, and the like.

CP removing unit 16 removes a CP from a signal to be output from RF unit 15.

FFT unit 17 transforms a time domain signal to be output from CP removing unit 16 to a frequency domain signal by FFT to demodulate the signal into a plurality of subcarriers.

Subcarrier placing unit 18 extracts each subcarrier to be output from FFT unit 17, on the basis of, for example, PUSC.

Multi-antenna received signal processing unit 81 performs adaptive array reception processing on a signal to be output from, for example, subcarrier placing unit 18.

MAC layer processing unit 14 includes a user data transmission managing unit 34, a coding unit 33, a modulating unit 32, a demodulating unit 25, a decoding unit 26, a user data reception managing unit 27 and a controller unit 35.

User data transmission managing unit 34 manages user data to be transmitted to radio terminal 3.

Coding unit 33 codes a downlink signal in accordance with a coding rate of an MCS (Modulation and Code Scheme) to be instructed by a switching unit 31.

Modulating unit 32 modulates a coded downlink signal to be transmitted to radio terminal 3, in accordance with a modulation mode of an MCS to be instructed by switching unit 31.

Demodulating unit 25 demodulates an uplink signal from radio terminal 3.

Decoding unit 26 decodes a demodulated uplink signal.

User data reception managing unit 27 manages user data received from radio terminal 3.

Controller unit 35 includes switching unit 31, a communication quality managing unit 28, a communication level managing unit 40, a switchover table storing unit 37, a switchover condition storing unit 42, a black list storing unit 41 and a switchover notifying unit 36.

Communication level managing unit 40 manages a communication level of a current downlink signal.

FIG. 3 is a diagram for illustrating the communication level.

With reference to FIG. 3, the communication level is set on the basis of an MIMO communication mode and an MCS.

For example, in a case where the communication level is "1", the MIMO communication mode is "MATRIX-A" and the MCS is "QPSK 1/2". In a case where the communication level is "9", the MIMO communication mode is "MATRIX-B" and the MCS is "64QAM 1/2".

A case where the value of the communication level increases represents "the communication level is raised" in this description, and a case where the value of the communication level decreases represents "the communication level is lowered" in this description. Moreover, with regard to an identical MIMO communication mode, a case where the MCS is changed to have a high data rate represents "the level of the MCS is raised" in this description, and a case where the MCS is changed to have a low data rate represents "the level of the MCS is lowered" in this description.

Communication quality managing unit 28 receives, from each radio terminal 3, a notification about a carrier to interference and noise ratio (CINR) and a packet error rate (PER) of a measured downlink signal, and stores the notified carrier to interference and noise ratio (CINR) and packet error rate (PER).

The CINR is calculated in such a manner that a signal which is not subjected to space-time coding or spatial coding (e.g., a preamble signal or a known signal) is received at the radio terminal, irrespective of a set MIMO communication mode.

In a case where the set MIMO communication mode is MATRIX-B, a signal which is transmitted without being subjected to spatial coding in the radio base station (e.g., a preamble signal or a known signal) is received at the radio terminal, and the CINR is calculated on the basis of the received signal. Moreover, in a case where the set MIMO communication mode is MATRIX-A, a signal which is transmitted without being subjected to space-time coding in the radio base station (e.g., a preamble signal or a known signal) is received at the radio terminal, and the CINR is calculated on the basis of the received signal. Alternatively, a signal which is transmitted after being subjected to space-time coding in the radio base station (a data stream) is received at the radio terminal, and the CINR is calculated from the received signal without performing space-time decoding on this signal.

In a case where the radio communication system is a communication system for WiMAX, the known signal may be, for example, a pilot signal. In a case of a communication system for PHS, the known signal may be, for example, a UW (Unique Word). In a case of a communication system for LTE, the known signal may be, for example, an RS (Reference Signal).

Switchover table storing unit 37 sets a requirement for a CINR in a case of raising a communication level, and also sets a requirement for a PER in a case of lowering the communication level.

Figure 4:
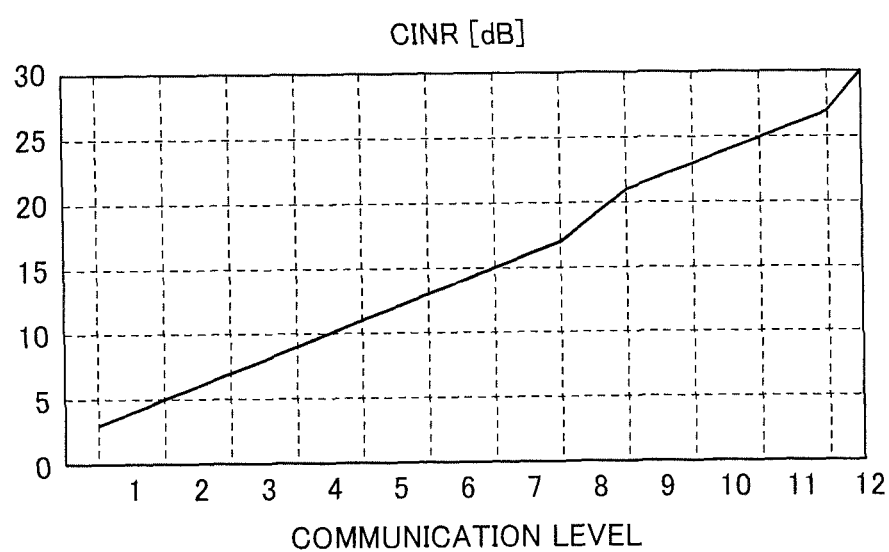
FIG. 4(a) is a diagram for illustrating a requirement for a CINR in a case of raising the communication level in a switchover table according to the first embodiment.
FIG. 4(b) is a diagram for illustrating a requirement for a PER in a case of lowering the communication level in the switchover table according to the first embodiment.
Figure 4:
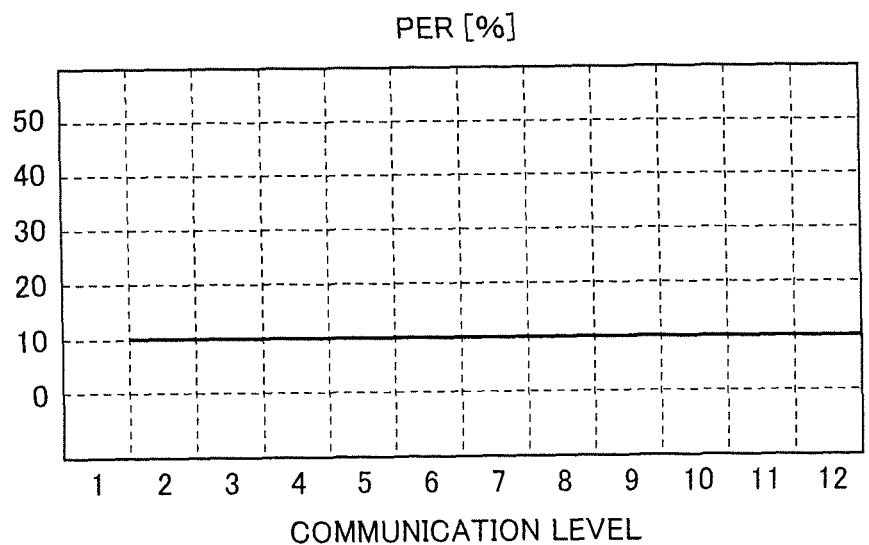

FIG. 4(*a*) is a diagram for illustrating the requirement for the CINR in the case of raising the communication level in a switchover table according to the first embodiment.

In the case of raising the communication level, the range of the CINR is set for each communication level. When a measured CINR is higher in value than the CINR corresponding to the current communication level, the communication level is switched in response to the measured CINR.

For example, in a case where the current communication level is "7" (the range of the CINR is "equal to or more than 15 dB but less than 17 dB") and the measured CINR is "20 dB", the communication level is raised to "8".

FIG. 4(*b*) is a diagram for illustrating the requirement for the PER in the case of lowering the communication level in the switchover table according to the first embodiment.

In the case of lowering the communication level, a lower limit value of the PER in a case of lowering the communication level by one step is set for each communication level. In the switchover table, the communication level is lowered by one step when the PER is equal to or more than 10% irrespective of the value of the communication level.

Black list storing unit 41 stores a black list in which a radio terminal prohibited with regard to switchover to MATRIX-B is registered.

Switchover condition storing unit 42 stores, as an S_CINR (i), a CINR which is a target of determination in a case where an MIMO communication mode is switched to MATRIX-B with regard to a radio terminal (i).

Switching unit 31 switches the communication level of each radio terminal on the basis of the switchover table. Switching unit 31 raises the communication level of each radio terminal on the basis of the value of the CINR, and lowers the communication level on the basis of the PER. When switching the MIMO communication mode from MATRIX-A to MATRIX-B with regard to the radio terminal (i) on the basis of the CINR, switching unit 31 stores the CINR at this time as an S_CINR(i) in switchover condition storing unit 42.

Thereafter, when switching the MIMO communication mode from MATRIX-B to MATRIX-A on the basis of the PER, in a case where the value of the CINR at this time is larger than a sum of the value of the S_CINR(i) stored in switchover condition storing unit 42 and an offset value a, switching unit 31 halts the switchover, to MATRIX-B, of the MIMO communication mode of the radio terminal (i) until any one of the following requirements (1) to (4) is satisfied.

(1) The radio terminal (i) is subjected to a hand-over.

(2) The communication with the radio terminal (i) is terminated.

(3) The duration of the communication with the radio terminal (i) becomes equal to or more than a predetermined value X [sec].

(4) The CINR of the radio terminal (i) becomes equal to or less than a predetermined value $\beta$ [dB].

Switchover notifying unit 36 outputs a signal of a notification about an MIMO communication mode and an MCS of a downlink signal to a radio terminal having a communication level switched by switching unit 31.

(Communication Level Switching Operation)

Figure 5:
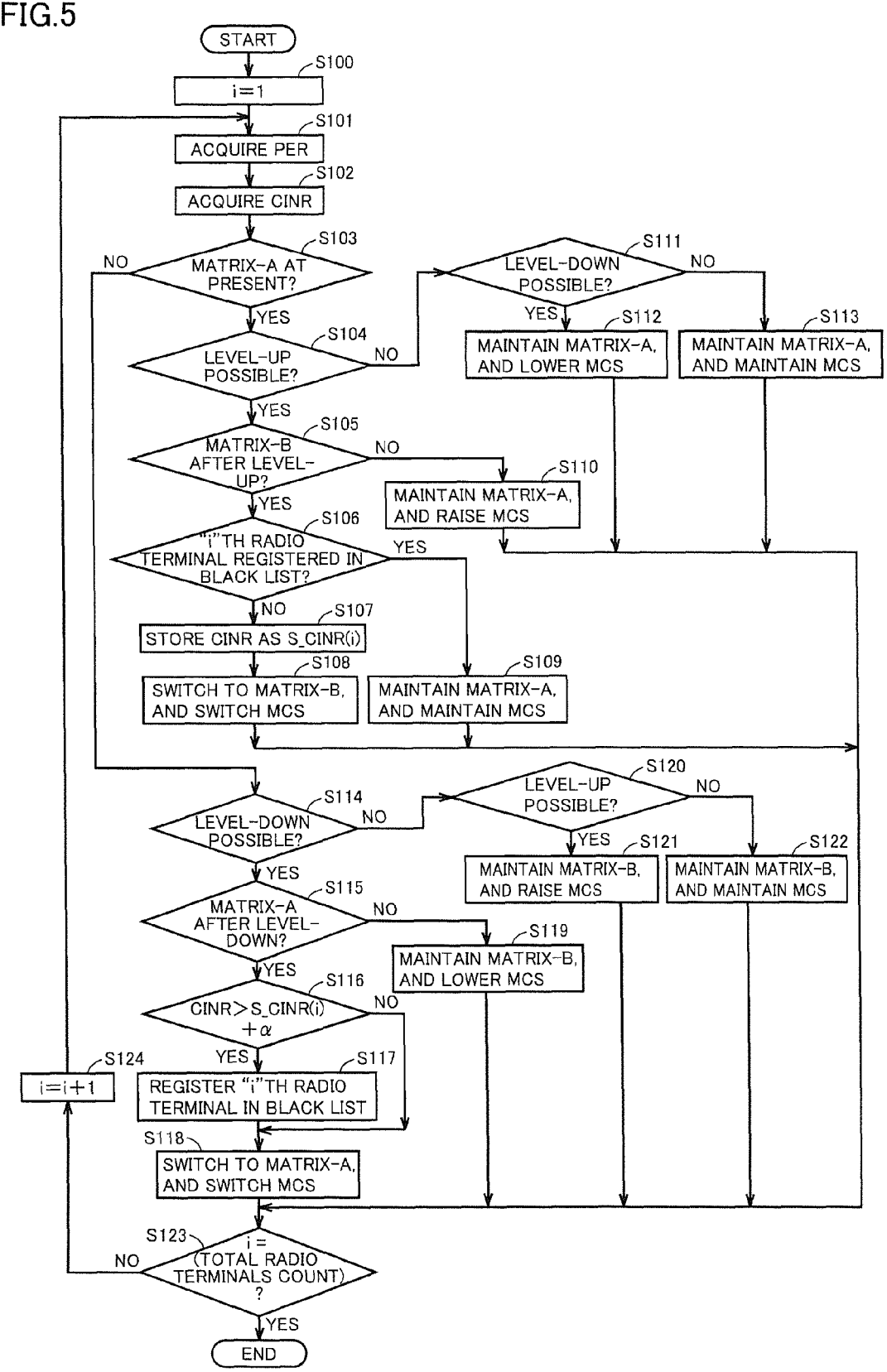
FIG. 5 is a flowchart showing a procedure of a communication level switching operation to be performed every one frame by the radio base station according to the first embodiment.

FIG. 5 is a flowchart showing a procedure of a communication level switching operation to be performed every one frame by the radio base station according to the first embodiment.

With reference to FIG. 5, switching unit 31 sets a user number i to 1 (step S100).

Next, communication quality managing unit 28 acquires a packet error rate (PER) and a carrier to interference and noise ratio (CINR) of a downlink signal from a radio terminal 3 of a user i in an uplink frame (steps S101, S102).

In a case where an MIMO communication mode at a current communication level is MATRIX-A (YES in step S103), the communication level of the radio terminal having the user number i can be raised in the switchover table (i.e., the acquired CINR is larger than the range of a CINR at the current communication level) (YES in step S104) and the MIMO communication mode at the communication level raised in the switchover table is MATRIX-B (YES in step S105), when the "i"th radio terminal is not registered in the black list (NO in step S106), switching unit 31 stores the acquired CINR as an S_CINR(i) in switchover condition storing unit 42 (step S107). Further, switching unit 31 raises the communication level. That is, switching unit 31 switches the MIMO communication mode to MATRIX-B, and also switches an MCS on the basis of the switchover table (step S108). On the other hand, when the "i"th radio terminal is registered in the black list (YES in step S106), switching unit 31 maintains the communication level. That is, switching unit 31 maintains the MIMO communication mode at MATRIX-A, and also maintains the MCS (step S109).

On the other hand, in a case where the MIMO communication mode at the current communication level is MATRIX-A (YES in step S103), the communication level of the radio terminal having the user number i can be raised in the switchover table (YES in step S104) and the MIMO communication mode at the communication level raised in the switchover table is MATRIX-A (NO in step S105), switching unit 31 raises the communication level. That is, switching unit 31 maintains the MIMO communication mode at MATRIX-A, and raises the MCS on the basis of the switchover table (step S110).

On the other hand, in a case where the MIMO communication mode at the current communication level is MATRIX-A (YES in step S103) and the communication level of the radio terminal having the user number i can be lowered in the switchover table (i.e., the acquired packet error rate (PER) is equal to or more than a lower limit value of the packet error rate (PER) at the current communication level set in the switchover table) (NO in step S104, YES in step S111), switching unit 31 lowers the communication level. That is, switching unit 31 maintains the MIMO communication mode at MATRIX-A, and lowers the MCS on the basis of the switchover table (step S112).

On the other hand, in a case where the MIMO communication mode at the current communication level is MATRIX-A (YES in step S103) and the communication level of the radio terminal having the user number i cannot be raised and lowered in the switchover table (NO in step S111), switching unit 31 maintains the communication level. That is, switching unit 31 maintains the MIMO communication mode at MATRIX-A, and also maintains the MCS (step S113).

On the other hand, in a case where the MIMO communication mode at the current communication level is MATRIX-B (NO in step S103), the communication level of the radio terminal having the user number i can be lowered in the switchover table (i.e., the acquired packet error rate (PER) is equal to or more than the lower limit value of the packet error rate (PER) at the current communication level set in the switchover table) (YES in step S114) and the MIMO communication mode at the communication level lowered in the switchover table is MATRIX-A (YES in step S115), when the acquired CINR is larger than the sum of the S_CINR(i) in switchover condition storing unit 42 and the offset value a (YES in step S116), switching unit 31 registers the "i"th radio terminal in the black list (step S117). Further, switching unit 31 lowers the communication level irrespective of whether or not the acquired CINR is larger than the sum of the S_CINR (i) in switchover condition storing unit 42 and the offset value α. That is, switching unit 31 switches the MIMO communication mode to MATRIX-A, and also switches the MCS on the basis of the switchover table (step S118).

On the other hand, in a case where the MIMO communication mode at the current communication level is MATRIX-B (NO in step S103), the communication level of the radio terminal having the user number i can be lowered in the switchover table (YES in step S114) and the MIMO communication mode at the communication level lowered in the switchover table is MATRIX-B (NO in step S115), switching unit 31 lowers the communication level. That is, switching unit 31 maintains the MIMO communication mode at MATRIX-B, and lowers the MCS on the basis of the switchover table (step S119).

On the other hand, in a case where the MIMO communication mode at the current communication level is MATRIX-B (NO in step S103) and the communication level of the radio terminal having the user number i can be raised in the switchover table (i.e., the acquired CINR is larger than the range of the CINR at the current communication level) (NO in step S114, YES in step S120), switching unit 31 raises the communication level. That is, switching unit 31 maintains the MIMO communication mode at MATRIX-B, and raises the MCS on the basis of the switchover table (step S121).

On the other hand, in a case where the MIMO communication mode at the current communication level is MATRIX-B (NO in step S103) and the communication level of the radio terminal having the user number i cannot be raised and lowered in the switchover table (NO in step S120), switching unit 31 maintains the communication level. That is, switching unit 31 maintains the MIMO communication mode at MATRIX-B, and also maintains the MCS (step S122).

Next, in a case where the user number i is not equal to the number of all users being in communication (NO in step S123), switching unit 31 increments the user number i by 1 (step S124), and then the program returns to step S101.

(Black List Registration Canceling Operation)

Figure 6:
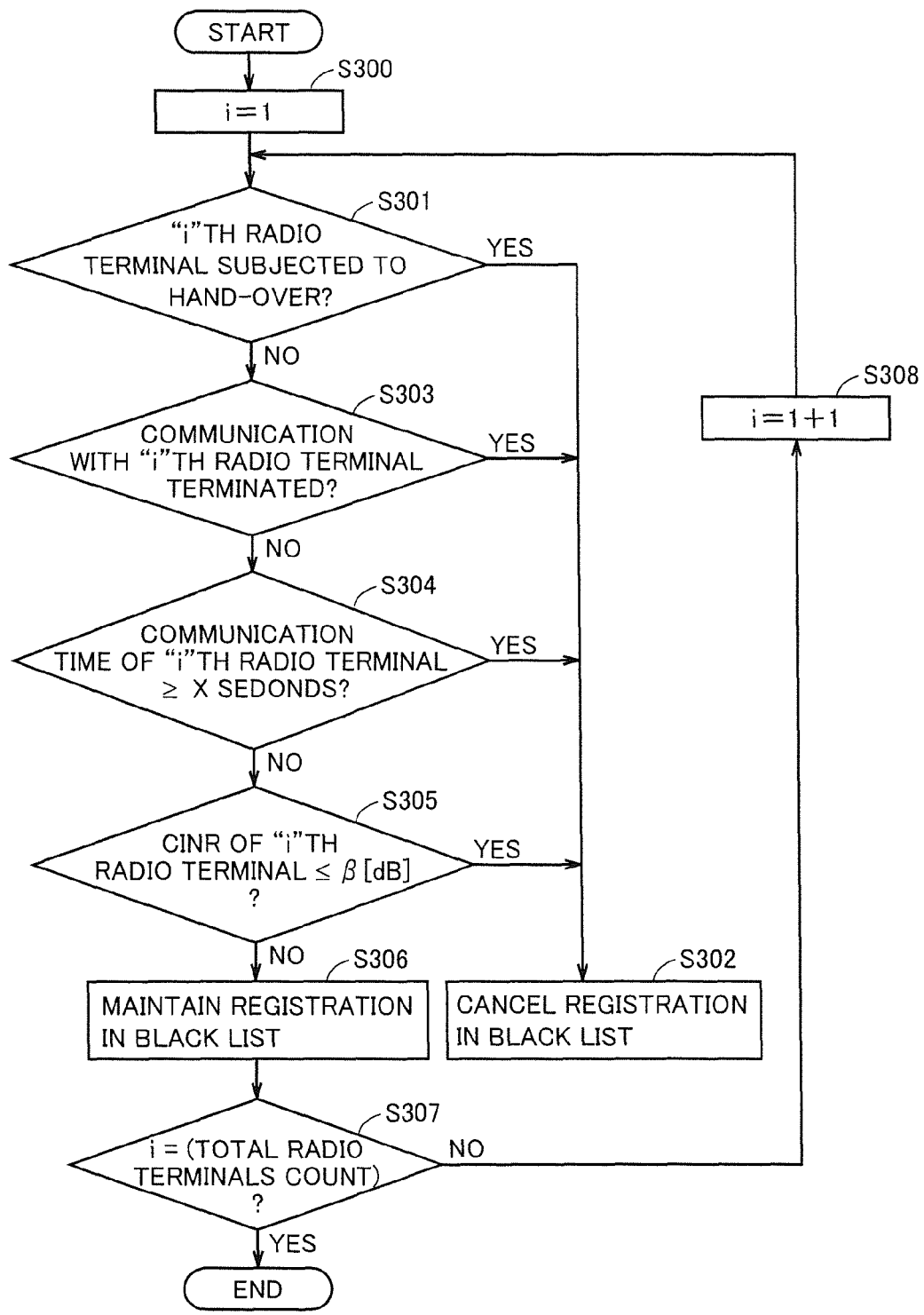
FIG. 6 is a flowchart showing a procedure of a black list registration canceling operation to be performed every one frame by the radio base station according to the first embodiment.

FIG. 6 is a flowchart showing a procedure of a black list registration canceling operation to be performed every one frame by the radio base station according to the first embodiment.

With reference to FIG. 6, switching unit 31 sets the user number i to 1 (step S300).

In a case where the "i"th radio terminal is subjected to a hand-over (YES in step S301), switching unit 31 deletes the "i"th radio terminal registered in the black list (step S302).

Moreover, in a case where the communication with the "i"th radio terminal is terminated (YES in step S303), switching unit 31 deletes the "i"th radio terminal registered in the black list (step S302).

Moreover, in a case where the duration of the communication with the "i"th radio terminal is equal to or more than X seconds (YES in step S304), switching unit 31 deletes the "i"th radio terminal registered in the black list. In a case where the communication is continued over a period of time which is equal to or more than a predetermined time, there is a possibility that a propagation path characteristic varies; therefore, the "i"th radio terminal is deleted temporarily from the black list (step S302).

Moreover, in a case where a CINR of a received signal at the "i"th radio terminal becomes equal to or less than the predetermined value β [dB] (YES in step S305), switching unit 31 deletes the "i"th radio terminal registered in the black list. A communication quality varies to a low level because the radio terminal (i) moves, and there is a possibility that the propagation path characteristic varies because of the movement of the radio terminal (i); therefore, the "i"th radio terminal is deleted temporarily from the black list (step S302).

Moreover, in a case other than the foregoing cases (NO in step S305), switching unit 31 does not delete the "i"th radio terminal registered in the black list (step S306).

As described above, according to the first embodiment, the value of the CINR is stored in the case where the switchover to MATRIX-B is performed. Moreover, in the case where the value of the CINR upon return to MATRIX-A is considerably larger than the value of the stored CINR, the switchover to MATRIX-B is not appropriate no matter how adequate the value of the CINR is. Therefore, the switchover to MATRIX-B is withheld until the predetermined requirement is satisfied. Thus, it is possible to prevent throughput from being lowered by performing the switchover of MATRIX-B in which stable communication is impossible.

[Second Embodiment]

(Configuration)

A radio base station according to a second embodiment is different from the radio base station according to the first embodiment in the following points.

A communication quality managing unit 28 receives, from each radio terminal 3, a notification about a carrier to interference and noise ratio (CINR) and a packet error rate (PER) of a measured downlink signal, and stores the notified carrier to interference and noise ratio (CINR) and packet error rate (PER).

In a case where a set MIMO communication mode is MATRIX-A, a data stream to be transmitted after being subjected to space-time coding is received at a radio terminal, and the CINR is calculated on the basis of one data stream obtained in such a manner that the received signal is subjected to space-time decoding. Moreover, in the case where the set MIMO communication mode is MATRIX-B, a data stream to be transmitted after being subjected to spatial multiplexing is received at the radio terminal, and the CINR is calculated on the basis of a plurality of data streams obtained in such a manner that the received signal is subjected to spatial division multiplexing.

A switchover table storing unit 37 sets a requirement for a CINR in a case of raising a communication level, and also sets a requirement for a PER in a case of lowering the communication level.

Figure 7:
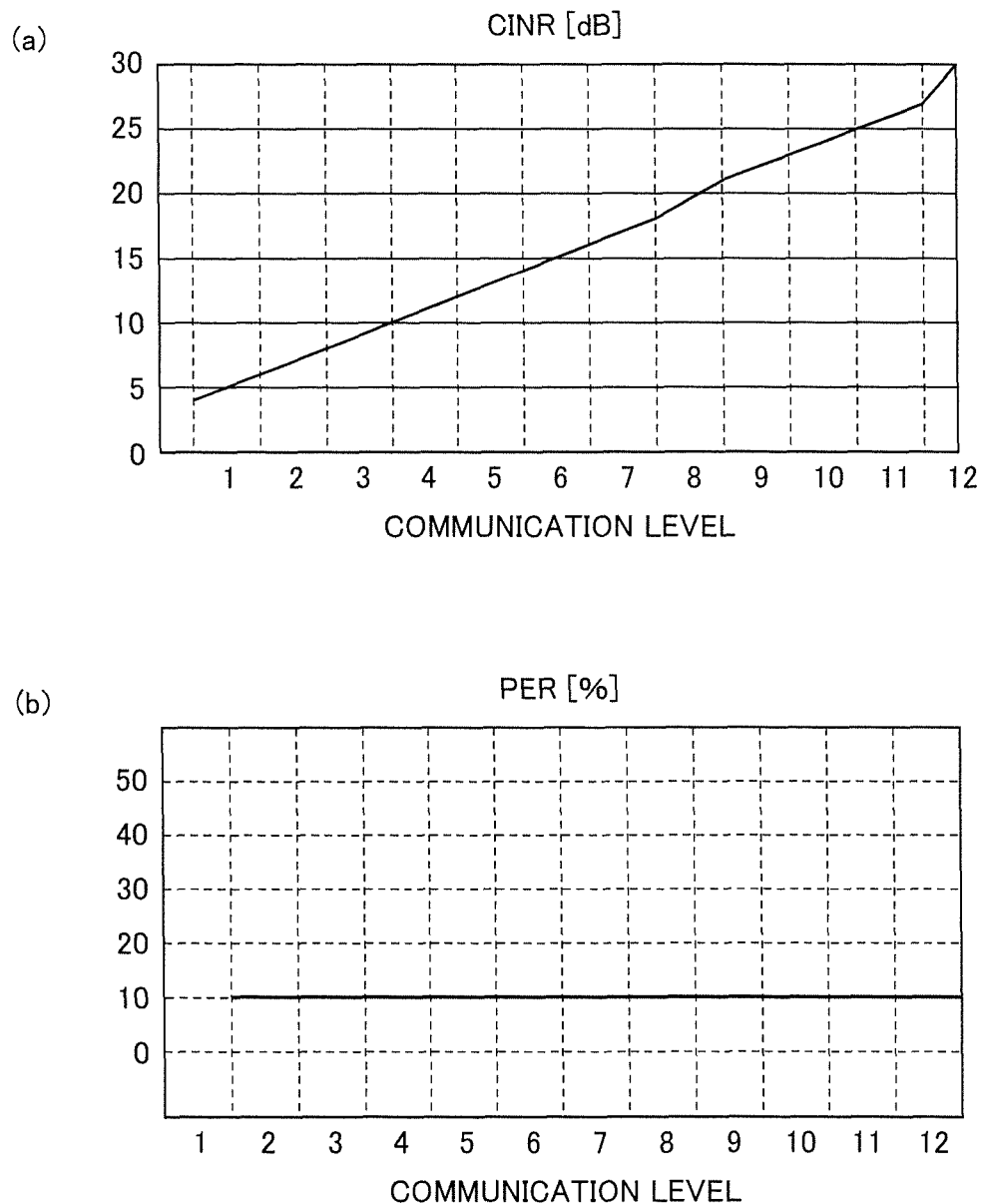
FIG. 7(a) is a diagram for illustrating a requirement for a CINR in a case of raising a communication level in a switchover table according to a second embodiment.
FIG. 7(b) is a diagram for illustrating a requirement for a PER in a case of lowering the communication level in the switchover table according to the second embodiment.

FIG. 7(a) is a diagram for illustrating the requirement for the CINR in the case of raising the communication level in a switchover table according to the second embodiment.

In the case of raising the communication level, the range of the CINR is set for each communication level. When a measured CINR is higher in value than the CINR corresponding to the current communication level, the communication level is switched in response to the measured CINR.

For example, in a case where the current communication level is "7" (the range of the CINR is "equal to or more than 16 dB but less than 18 dB") and the measured CINR is "20 dB", the communication level is raised to "8".

FIG. 7(b) is a diagram for illustrating the requirement for the PER in the case of lowering the communication level in the switchover table according to the second embodiment.

In the case of lowering the communication level, a lower limit value of the PER in a case of lowering the communication level by one step is set for each communication level. As in the first embodiment, in the switchover table, the communication level is lowered by one step when the PER is equal to or more than 10% irrespective of the value of the communication level.

A switching unit 31 switches the communication level of each radio terminal on the basis of the switchover table. Switching unit 31 raises the communication level of each radio terminal on the basis of the value of the CINR, and lowers the communication level on the basis of the PER. Switching unit 31 switches the MIMO communication mode from MATRIX-A to MATRIX-B on the basis of the CINR and then, when the CINR after a lapse of a predetermined time (X frames) is less than a threshold value TH_B, halts the switchover to MATRIX-B until a predetermined requirement is satisfied. The switchover to MATRIX-B is halted as described above because of the following consideration. That is, in a case where the switchover to MATRIX-B is performed on the basis of a value of a CINR of a signal which is not subjected to spatial multiplexing, when the actual result largely differs from a predicted value of a CINR after the spatial multiplexing, spatial multiplexing communication becomes unstable because of a transmission path characteristic and the like.

(Communication Level Switching Operation)

Figure 8:
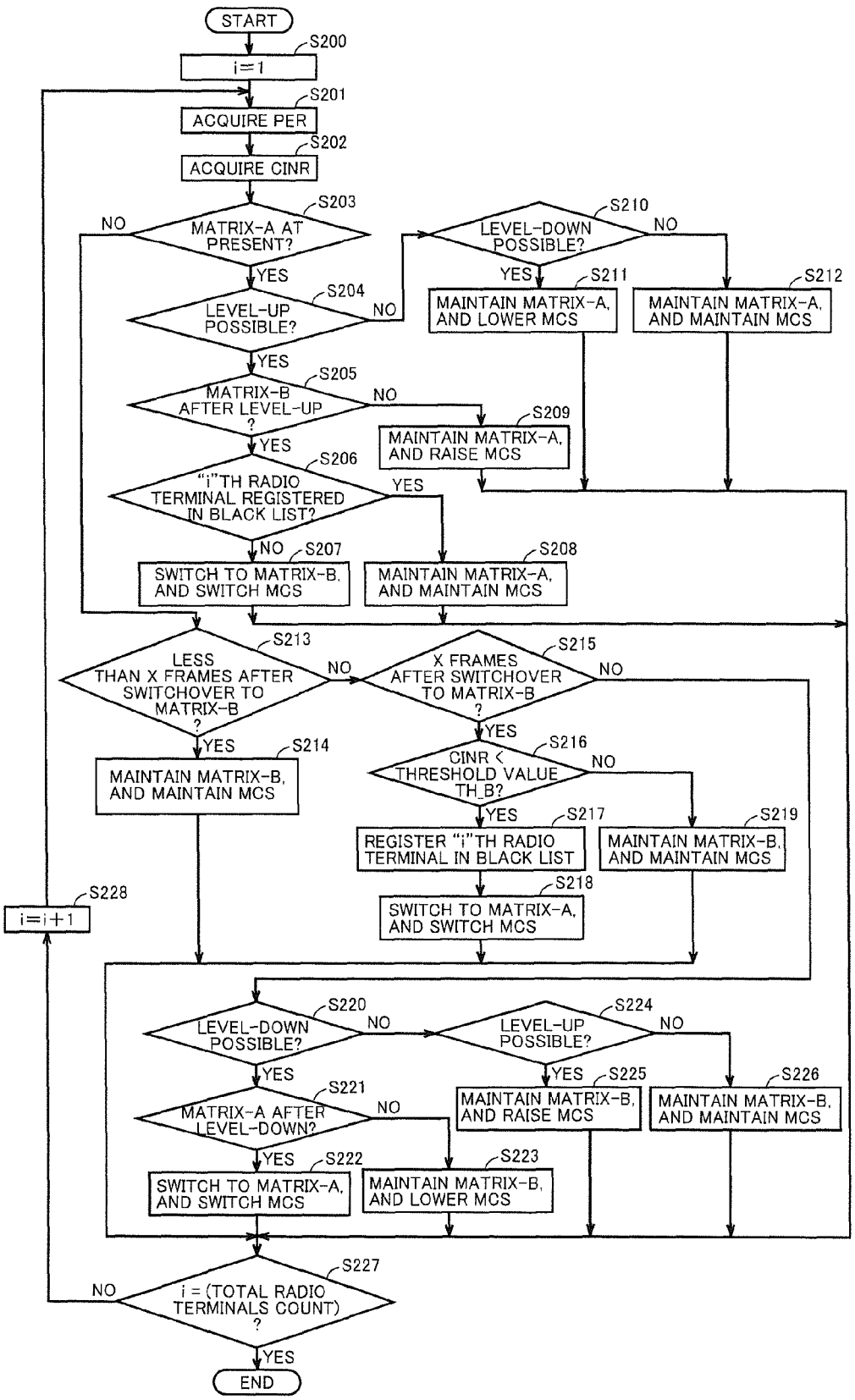
FIG. 8 is a flowchart showing a procedure of a communication level switching operation to be performed every one frame by a radio base station according to the second embodiment.

FIG. 8 is a flowchart showing a procedure of a communication level switching operation to be performed every one frame by the radio base station according to the second embodiment.

With reference to FIG. 8, switching unit 31 sets a user number i to 1 (step S200).

Next, communication quality managing unit 28 acquires a packet error rate (PER) and a carrier to interference and noise ratio (CINR) of a downlink signal from a radio terminal 3 of a user i in an uplink frame (steps S201, S202).

In a case where an MIMO communication mode at a current communication level is MATRIX-A (YES in step S203), the communication level of the radio terminal having the user number i can be raised in the switchover table (i.e., the acquired CINR is larger than the range of a CINR at the current communication level) (YES in step S204) and the MIMO communication mode at the communication level raised in the switchover table is MATRIX-B (YES in step S205), when the "i"th radio terminal is not registered in a black list (NO in step S206), switching unit 31 raises the communication level. That is, switching unit 31 switches the MIMO communication mode to MATRIX-B, and also switches an MCS on the basis of the switchover table (step S207). On the other hand, when the "i"th radio terminal is registered in the black list (YES in step S206), switching unit 31 maintains the communication level. That is, switching unit 31 maintains the MIMO communication mode at MATRIX-A, and also maintains the MCS (step S208).

On the other hand, in a case where the MIMO communication mode at the current communication level is MATRIX-A (YES in step S203), the communication level of the radio terminal having the user number i can be raised in the switchover table (YES in step S204) and the MIMO communication mode at the communication level raised in the switchover table is MATRIX-A (NO in step S205), switching unit 31 raises the communication level. That is, switching unit 31 maintains the MIMO communication mode at MATRIX-A, and raises the MCS on the basis of the switchover table (step S209).

On the other hand, in a case where the MIMO communication mode at the current communication level is MATRIX-A (YES in step S203) and the communication level of the radio terminal having the user number i can be lowered in the switchover table (i.e., the acquired packet error rate (PER) is equal to or more than a lower limit value of the packet error rate (PER) at the current communication level set in the switchover table) (NO in step S204, YES in step S210), switching unit 31 lowers the communication level. That is, switching unit 31 maintains the MIMO communication mode at MATRIX-A, and lowers the MCS on the basis of the switchover table (step S211).

On the other hand, in a case where the MIMO communication mode at the current communication level is MATRIX-A (YES in step S203) and the communication level of the radio terminal having the user number i cannot be raised and lowered in the switchover table (NO in step S210), switching unit 31 maintains the communication level. That is, switching unit 31 maintains the MIMO communication mode at MATRIX-A, and also maintains the MCS (step S212).

On the other hand, in a case where the MIMO communication mode at the current communication level is MATRIX-B (NO in step S203) and the predetermined number of frames (X) is not elapsed after the switchover to MATRIX-B in the current frame (YES in step S213), switching unit 31 maintains the communication level. That is, switching unit 31 maintains the MIMO communication mode at MATRIX-B, and also maintains the MCS (step S214).

On the other hand, in a case where the MIMO communication mode at the current communication level is MATRIX-B (NO in step S203) and the current frame corresponds to a frame at the time when the predetermined number of frames (X) is elapsed exactly after the switchover to MATRIX-B (NO in step S213, YES in S215), when the acquired CINR is smaller than a threshold value TH_B (YES in step S216), switching unit 31 registers the "i"th radio terminal in the black list (step S217), and lowers the communication level. That is, switching unit 31 switches the MIMO communication mode to MATRIX-A, and also switches the MCS on the basis of the switchover table (step S218). On the other hand, when the acquired CINR is equal to or more than threshold value TH_B (NO in step S216), switching unit 31 maintains the communication level. That is, switching unit 31 maintains the MIMO communication mode at MATRIX-B, and also maintains the MCS (step S219).

On the other hand, in a case where the MIMO communication mode at the current communication level is MATRIX-B (NO in step S203), the current frame corresponds to a frame at the time when Y frames (Y>X) are elapsed after the switchover to MATRIX-B (NO in step S213, NO in step S215), the communication level of the radio terminal having the user number i can be lowered in the switchover table (i.e., the acquired packet error rate (PER) is equal to or more than a lower limit value of a packet error rate (PER) at the current communication level set in the switchover table) (YES in step S220) and the MIMO communication mode at the communication level lowered in the switchover table is MATRIX-A (YES in step S221), switching unit 31 lowers the communication level. That is, switching unit 31 switches the MIMO communication mode to MATRIX-A, and also switches the MCS on the basis of the switchover table (step S222).

On the other hand, in a case where the MIMO communication mode at the current communication level is MATRIX-B (NO in step S203), the current frame corresponds to the frame at the time when Y frames (Y>X) are elapsed after the switchover to MATRIX-B (NO in step S213, NO in step S215), the communication level of the radio terminal having the user number i can be lowered in the switchover table (YES in step S220) and the MIMO communication mode at the communication level lowered in the switchover table is MATRIX-B (NO in step S221), switching unit 31 lowers the communication level. That is, switching unit 31 maintains the MIMO communication mode at MATRIX-B, and lowers the MCS on the basis of the switchover table (step S223).

On the other hand, in a case where the MIMO communication mode at the current communication level is MATRIX-B (NO in step S203), the current frame corresponds to the frame at the time when Y frames (Y>X) are elapsed after the switchover to MATRIX-B (NO in step S213, NO in step S215) and the communication level of the radio terminal having the user number i can be raised in the switchover table (i.e., the acquired CINR is larger than the range of the CINR at the current communication level) (NO in step S220, YES in step S224), switching unit 31 raises the communication level. That is, switching unit 31 maintains the MIMO communication mode at MATRIX-B, and raises the MCS on the basis of the switchover table (step S225).

On the other hand, in a case where the MIMO communication mode at the current communication level is MATRIX-B (NO in step S203), the current frame corresponds to the frame at the time when Y frames (Y>X) are elapsed after the switchover to MATRIX-B (NO in step S213, NO in step S215) and the communication level of the radio terminal having the user number i cannot be raised and lowered in the switchover table (NO in step S224), switching unit 31 maintains the communication level. That is, switching unit 31 maintains the MIMO communication mode at MATRIX-B, and also maintains the MCS (step S226).

Next, in a case where the user number i is not equal to the number of all users being in communication (NO in step S227), switching unit 31 increments the user number i by 1 (step S228), and then the program returns to step S201.

As described above, according to the second embodiment, in the case where the value of the CINR at the time when the predetermined number of frames is elapsed after the switchover to MATRIX-B is lower than the threshold value that allows maintenance of communication in MATRIX-B, the switchover to MATRIX-B is withheld until the predetermined requirement is satisfied. Thus, it is possible to prevent throughput from being lowered by performing the switchover of MATRIX-B in which stable communication is impossible.

(Modification Examples)

The present invention is not limited to the foregoing embodiments, but may involve the following modification examples.

(1) Switchover Table

In the embodiments of the present invention, in the case of raising the communication level, switching unit 31 performs the switchover to the communication level corresponding to the carrier to interference and noise ratio (CINR) of the measured downlink signal irrespective of the current communication level; however, the present invention is not limited thereto. For example, in a case where the measured carrier to interference and noise ratio (CINR) exceeds the range of the carrier to interference and noise ratio (CINR) responsive to the current communication level, the communication level may be raised by one step.

(2) Non-Spatial Multiplexing Mode/Spatial Multiplexing Mode

In the embodiments of the present invention, the description is given of the switchover from the non-spatial multiplexing mode (DL MIMO MATRIX-A) to the spatial multiplexing mode (DL MIMO MATRIX-B) in the communication system for WiMAX; however, the present invention is not limited thereto. The present invention may also be applicable to switchover from a non-spatial multiplexing mode to a spatial multiplexing mode in a different communication system.

(3) Communication Quality of Downlink Signal

In the embodiments of the present invention, the communication quality (PER, CINR) of the downlink signal is transmitted from the radio terminal to the radio base station in the uplink frame; however, the present invention is not limited thereto. For example, the communication quality of the downlink signal may be calculated on the basis of an NACK (Negative ACKnowledgement) signal in a case of ARQ (Automatic Repeat Request) or HARQ (Hybrid Automatic Repeat Request) processing on the side of the radio base station.

(4) Registration Cancellation of Black List

In the embodiments of the present invention, as described in step S305 shown in FIG. 6, the switching unit deletes the "i"th radio terminal registered in the black list in the case where the CINR of the received signal at the "i"th radio terminal is equal to or less than the predetermined value β [dB]; however, the present invention is not limited thereto.

For example, the switching unit may delete the "i"th radio terminal registered in the black list in a case where the PER of the received signal at the "i"th radio terminal is equal to or more than a predetermined value γ [%] or the receiving level of the received signal at the "i"th radio terminal is equal to or less than a predetermined value R.

(5) Frequency of Multiplexing

In the embodiments of the present invention, the radio base station includes the two antennas, and the multi-antenna transmitting signal processing unit performs the spatial multiplexing on the two data streams in the dual multiplexing manner in the case where the set MIMO communication mode is MATRIX-B; however, the present invention is not limited thereto. The radio base station may include "N" (N: an arbitrary natural number which is equal to or more than 2) antennas, and the multi-antenna transmitting signal processing unit may perform the spatial multiplexing on "N" data streams in an "N" multiplexing manner in the case where the set MIMO communication mode is MATRIX-B.

It is to be understood that the disclosed embodiments are only illustrative and not restrictive in all respects. The scope of the present invention is interpreted by the appended claims rather than the foregoing description, and it is intended that all kinds of variations are contained in a meaning and a range equivalent to the claims.

REFERENCE SIGNS LIST

1 Radio communication system, 2 First communication apparatus (radio base station), 3, 3a to 3n Second communication apparatus (radio terminal), 10, 11 Antenna, 13 Transmitting unit, 12 Receiving unit, 14 MAC layer processing unit, 15, 20 RF unit, 16 CP removing unit, 17 FFT unit, 18, 23 Subcarrier placing unit, 21 CP adding unit, 22 IFFT unit, 24 Multi-antenna transmitting signal processing unit, 25 Demodulating unit, 26 Decoding unit, 27 User data reception managing unit, 28 Communication quality managing unit, 31 Switching unit, 32 Modulating unit, 33 Coding unit, 34 User data transmission managing unit, 35 Controller unit, 36 Switchover notifying unit, 37 Switchover table storing unit, 40 Communication level managing unit, 41 Black list storing unit, 42 Switchover condition storing unit, 81 Multi-antenna received signal processing unit, 82 First coupler/distributor, 83 Second coupler/distributor.

The invention claimed is:

1. A communication apparatus comprising:
a plurality of antennas;
a quality managing unit for acquiring or calculating a first communication quality and a second communication quality of a received signal at a different communication apparatus;
a switching unit for switching a setting of a communication mode for a transmitting signal to said different communication apparatus from a non-spatial multiplexing mode to a spatial multiplexing mode on the basis of said first communication quality, and switching the setting of the communication mode for the transmitting signal to said different communication apparatus from said spatial multiplexing mode to said non-spatial multiplexing mode on the basis of said second communication quality; and
a transmitting unit for processing the transmitting signal to said different communication apparatus to output the processed signal to said plurality of antennas, on the basis of said set communication mode,
wherein said switching unit,
when switching the setting of the communication mode for the transmitting signal to said different communication apparatus from said non-spatial multiplexing mode to said spatial multiplexing mode on the basis of said first communication quality, stores said first communication quality as a switchover reference value, and,
subsequently, when switching the setting of the communication mode for the transmitting signal to said different communication apparatus from said spatial multiplexing mode to said non-spatial multiplexing mode and when the first communication quality is larger than said switchover reference value by a value which is equal to or more than a predetermined value, halts switching the setting of the communication mode for the transmitting signal to said different communication apparatus from said non-spatial multiplexing mode to said spatial multiplexing mode, irrespective of said first communication quality, until at least one predetermined condition is satisfied.

2. The communication apparatus according to claim 1, wherein said first communication quality is a communication quality of a preamble signal or a known signal which is not transmitted in a state subjected to spatial multiplexing.

3. The communication apparatus according to claim 1, wherein said at least one predetermined condition comprises that said different communication apparatus is subjected to a hand-over.

4. The communication apparatus according to claim 1, wherein said at least one predetermined condition comprises that communication with said different communication apparatus is continued for a period of time which is equal to or more than a predetermined time.

5. The communication apparatus according to claim 1, wherein said at least one predetermined condition comprises that communication with said different communication apparatus is terminated.

6. The communication apparatus according to claim 1, wherein said at least one predetermined condition comprises that said first communication quality or said second communication quality of the received signal at said different communication apparatus becomes equal to or less than a predetermined value.

7. The communication apparatus according to claim 1, wherein said at least one predetermined condition comprises that a level of the received signal at said different communication apparatus becomes equal to or less than a predetermined value.

8. The communication apparatus according to claim 1, wherein said switching unit does not switch the setting of the communication mode for a transmitting signal to said different communication apparatus from said non-spatial multiplexing mode to said spatial multiplexing mode whenever the different communication apparatus is registered in a black list, and wherein halting switching the setting of the communication mode for the transmitting signal from said non-spatial multiplexing mode to said spatial multiplexing mode comprises registering the different communication apparatus in the black list.

9. A communication apparatus comprising:
a plurality of antennas;
a quality managing unit for acquiring or calculating a first communication quality of a received signal at a different communication apparatus;
a switching unit for switching a setting of a communication mode for a transmitting signal to said different communication apparatus from a non-spatial multiplexing mode to a spatial multiplexing mode on the basis of said first communication quality; and a transmitting unit for processing the transmitting signal to said different communication apparatus to output the processed signal to said plurality of antennas, on the basis of said set communication mode, wherein said switching unit, at a first time, switches the setting of the communication mode for the transmitting signal to said different communication apparatus from said non-spatial multiplexing mode to said spatial multiplexing mode on the basis of said first communication quality, and, after a lapse of a predetermined time from the first time, when said first communication quality is less than a predetermined value, switches the setting of the communication mode for the transmitting signal to said different communication apparatus from said spatial multiplexing mode to said non-spatial multiplexing mode, and halts switching the setting of the communication mode for the transmitting signal to said different communication apparatus from said non-spatial multiplexing mode to said spatial multiplexing mode, irrespective of said first communication quality, until at least one predetermined condition is satisfied.

10. The communication apparatus according to claim 9, wherein said first communication quality is a communication quality of a signal obtained by decoding a signal which is transmitted in a state subjected to non-spatial multiplexing or a communication quality of a signal obtained by performing spatial division multiplexing on a signal which is transmitted in a state subjected to spatial multiplexing.

11. The communication apparatus according to claim 9, wherein said at least one predetermined condition comprises that said different communication apparatus is subjected to a hand-over.

12. The communication apparatus according to claim 9, wherein said at least one predetermined condition comprises that communication with said different communication apparatus is continued for a period of time which is equal to or more than a predetermined time.

13. The communication apparatus according to claim 9, wherein said at least one predetermined condition comprises that communication with said different communication apparatus is terminated.

14. The communication apparatus according to claim 9, wherein said at least one predetermined condition comprises that said first communication quality of the received signal at said different communication apparatus becomes equal to or less than a predetermined value.

15. The communication apparatus according to claim 9, wherein said at least one predetermined condition comprises that a level of the received signal at said different communication apparatus becomes equal to or less than a predetermined value.

16. A communication method for a communication apparatus including a plurality of antennas, comprising:

acquiring or calculating a first communication quality and a second communication quality of a received signal at a different communication apparatus;

switching a setting of a communication mode for a transmitting signal to said different communication apparatus from a non-spatial multiplexing mode to a spatial multiplexing mode on the basis of said first communication quality and storing said first communication quality as a switchover reference value;

subsequently, when switching the setting of the communication mode for the transmitting signal to said different communication apparatus from said multiplexing mode to said non-spatial multiplexing mode on the basis of said second communication quality and when the first communication quality is larger than said switchover reference value by a value which is equal to or more than a predetermined value, halting the switching of the setting of the communication mode for the transmitting signal from said non-spatial multiplexing mode to said spatial multiplexing mode, irrespective of said first communication quality, until at least one predetermined condition is satisfied; and processing the transmitting signal to said different communication apparatus to output the processed signal to said plurality of antennas, on the basis of said set communication mode.

* * * * *